United States Patent
Escobar-Bowser et al.

(10) Patent No.: US 8,218,257 B2
(45) Date of Patent: Jul. 10, 2012

(54) DISK DRIVE WITH MULTIPLE LEVEL POWER REDUCTION DURING WRITE

(75) Inventors: Priscilla Escobar-Bowser, Plano, TX (US); Mark Wolfe, Plano, TX (US); Indumini Wijayanayake Ranmuthu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1128 days.

(21) Appl. No.: 11/844,934

(22) Filed: Aug. 24, 2007

(65) Prior Publication Data

US 2008/0298186 A1    Dec. 4, 2008

Related U.S. Application Data

(60) Provisional application No. 60/941,375, filed on Jun. 1, 2007.

(51) Int. Cl.
G11B 5/09 (2006.01)
G11B 5/02 (2006.01)

(52) U.S. Cl. .......................................... 360/46; 360/68

(58) Field of Classification Search ........................ None
See application file for complete search history.

(56) References Cited

U.S. PATENT DOCUMENTS 6,122,127 A * 9/2000 Flinsbaugh .................... 360/66
7,397,622 B1 * 7/2008 Liikanen et al. .............. 360/66

* cited by examiner

*Primary Examiner* — K. Wong
(74) *Attorney, Agent, or Firm* — Lawrence J. Bassuk; W. James Brady; Frederick J. Telecky, Jr.

(57) ABSTRACT

A disk drive data storage system comprising at least one data storage disk and a sensor assembly proximate the data storage disk. The sensor assembly further comprises circuitry for writing data to the data storage disk and circuitry for reading data from the data storage disk. The system also comprises circuitry for controlling the circuitry for reading data during different time periods so that the circuitry for reading data consumes different levels of power while the circuitry for writing data is writing data to the data storage disk.

2 Claims, 8 Drawing Sheets

DISK DRIVE WITH MULTIPLE LEVEL POWER REDUCTION DURING WRITE

CROSS-REFERENCES TO RELATED APPLICATION

This application claims priority to, the benefit of the filing date of, and hereby incorporates herein by reference, U.S. Provisional Patent Application 60/941,375, entitled "Disk Drive With Multiple Level Power Reduction During Write," and filed Jun. 1, 2007.

STATEMENT REGARDING FEDERALLY SPONSORED RESEARCH OR DEVELOPMENT

Not Applicable.

BACKGROUND OF THE INVENTION

The preferred embodiments are in the field of magnetic storage media drives and are more specifically directed to a disk drive with multiple level power reduction during write operations.

Magnetic disk drives are used over a wide range of electronic systems, including large-scale network servers, desktop computers and workstations, portable computers (e.g., laptops), and now even in modern handheld devices such as portable digital audio players. As is well known in the art, the capacity of disk drives has greatly increased over recent years, at ever decreasing cost per megabit, while at the same time the size of the drive continues to decrease. Indeed, the decrease in size permits the use of drives in smaller equipment, including the above-mentioned audio players and with likely additional applications in the future.

The decrease in disk drive size has been achieved in many ways, including the use of smaller parts and the dimensions between those parts. A relatively smaller drive includes a smaller disk or a stack of smaller disks arranged in a so-called head stack, where the axis of each disk is co-aligned and an arm is typically located between each disk as well as on top of the uppermost disk and below the lowermost disk. The arms support one or more read/write sensor assemblies (or "heads") for read/write operations with respect to the disk adjacent a respective sensor assembly. In addition, often integrated circuits are included within the drive, where one common integrated circuit is the drive preamplifier, which communicates electrical signals to each sensor assembly so as to accomplish data read and write operations. The marketplace has dictated the reduction in size of this and sometimes other circuits to reduce the drive size, and also to reduce overall cost. One skilled in the art will appreciate other manners in which drive sizes have been reduced.

Various factors such as the materials, dimensions, proximity, and component interfaces of the above and related components provide increasing heat in device drives. For example, the movable arms that support the sensor assemblies as well as the arm-supporting movable member (sometimes referred to as an E-block) are typically metal of varying sizes and those sizes as well as spacing between them may be small if not microscopic in dimensions. As another example, the entire E-block, and correspondingly the arms it supports, is rotated within an arc by a mechanism that typically includes a coil with magnets above and below the coil so that a reversible current through the coil can cause a partial rotation of the mechanism in either direction across the arc. The current to operate the coil, and the current provided by the preamplifier to write data to the disk, and to a lesser extent to read from a disk, also generates heat. As still another example, with physical contact between certain components there is little, if any, air gap and, thus air is trapped and therefore is unable to efficiently release heat in such an area. In other words, there is simply little or no room for convection cooling and there is heat transfer between components. Various other factors also contribute to the accumulation of heat in and near the head stack assembly. With larger media, the movable arms must be longer and therefore require a greater amount of current to drive the inductance of the above-mentioned coils, thereby creating more heat. Further, the dimensions of the arms may reduce the ability to dissipate heat. As another example, the generation of heat increases with power demands required to support increasing revolutions per minute of the media as well as increasing data rates, such as 800 to 900 mbps in contemporary laptops. Still further, high power is required to support the transition between write and read operations, with a greater power demand in the transition from write to read. Still other examples may be appreciated by one skilled in the art.

Heat build-up in and near the head stack assembly is undesirable for many reasons. For example, long term heat exposure affects the lifespan of the unit, such as in connection with the deleterious effect that heat has on the silicon used to form the integrated circuit preamplifier. As known in the integrated circuit art, the reliability and lifespan of an integrated circuit are reduced at higher temperatures, and the reductions will be exponential as temperatures reach a certain level or range. Indeed, as the preamplifier integrated circuit is reduced in size, the electrical current is forced to occupy a smaller area and, as a result, higher temperatures, including higher junction temperatures, are incurred on the preamplifier and exacerbate the above considerations. As another example, the accumulation of heat necessarily limits the speed at which the drive may be operated, since exceeding a determined limit will cause still more heat and affect lifespan and data integrity. In some applications, these factors may be less critical, whereas in others the demands of the marketplace are extremely high, so such factors are paramount and therefore so are the above-noted considerations. Additionally, certain applications may be more write intensive (e.g., personal video recorders), and since the write operation uses more power consumption than the read operation, these write-intensive applications expose the drive to longer periods of heat in use versus a less write-intensive application.

With all of the attributes described, the present inventors seek to improve upon aspects related to the above and more specifically endeavor to reduce power consumption, and the corresponding heat generated by such consumption, in a disk drive. With such reduction, various benefits may be achieved. For example, for a given speed of operation and with a relative reduction in power consumption and heat, then the lifespan and reliability of the integrated circuit is improved. As another example, with a technique that reduces power consumption from an acceptable level to a lower level, then there is margin between the lower level and the acceptable level, and that margin may be re-used by increasing the read/write speed so that even though power consumption is increased from the lower level, it is workable as it still remains at or below the acceptable level. These and other benefits will be appreciated by one skilled in the art in connection with the preferred embodiments detailed below.

BRIEF SUMMARY OF THE INVENTION

In one preferred embodiment, there is a disk drive data storage system. The system comprises at least one data storage disk. The system also comprises a sensor assembly proximate the data storage disk, and the sensor assembly further comprises circuitry for writing data to the data storage disk and circuitry for reading data from the data storage disk. The system also comprises circuitry for controlling the circuitry for reading data during a first time period so that the circuitry for reading data consumes a first level of power while the circuitry for writing data is writing data to the data storage disk. The system also comprises circuitry for controlling the circuitry for reading data during a second time period so that the circuitry for reading data consumes a second level of power while the circuitry for writing data is writing data to the data storage disk, wherein the second level is greater than the first level. Lastly, the system also comprises circuitry for controlling the circuitry for reading data during a third time period so that the circuitry for reading data consumes a third level of power, greater than the second level, while the circuitry for reading data is reading data from the data storage disk.

Other aspects are also disclosed and claimed.

DETAILED DESCRIPTION OF THE INVENTION

The inventive scope is described by way of example below in connection with a preferred embodiment as implemented into a magnetic disk drive used in connection with a computer system. However, other preferred embodiments, including overall systems, may receive significant benefit with disk drives constructed per the teachings of this document. Accordingly, it is to be understood that the following description is provided by way of example only and is not intended to limit the inventive scope.

Figure 1:
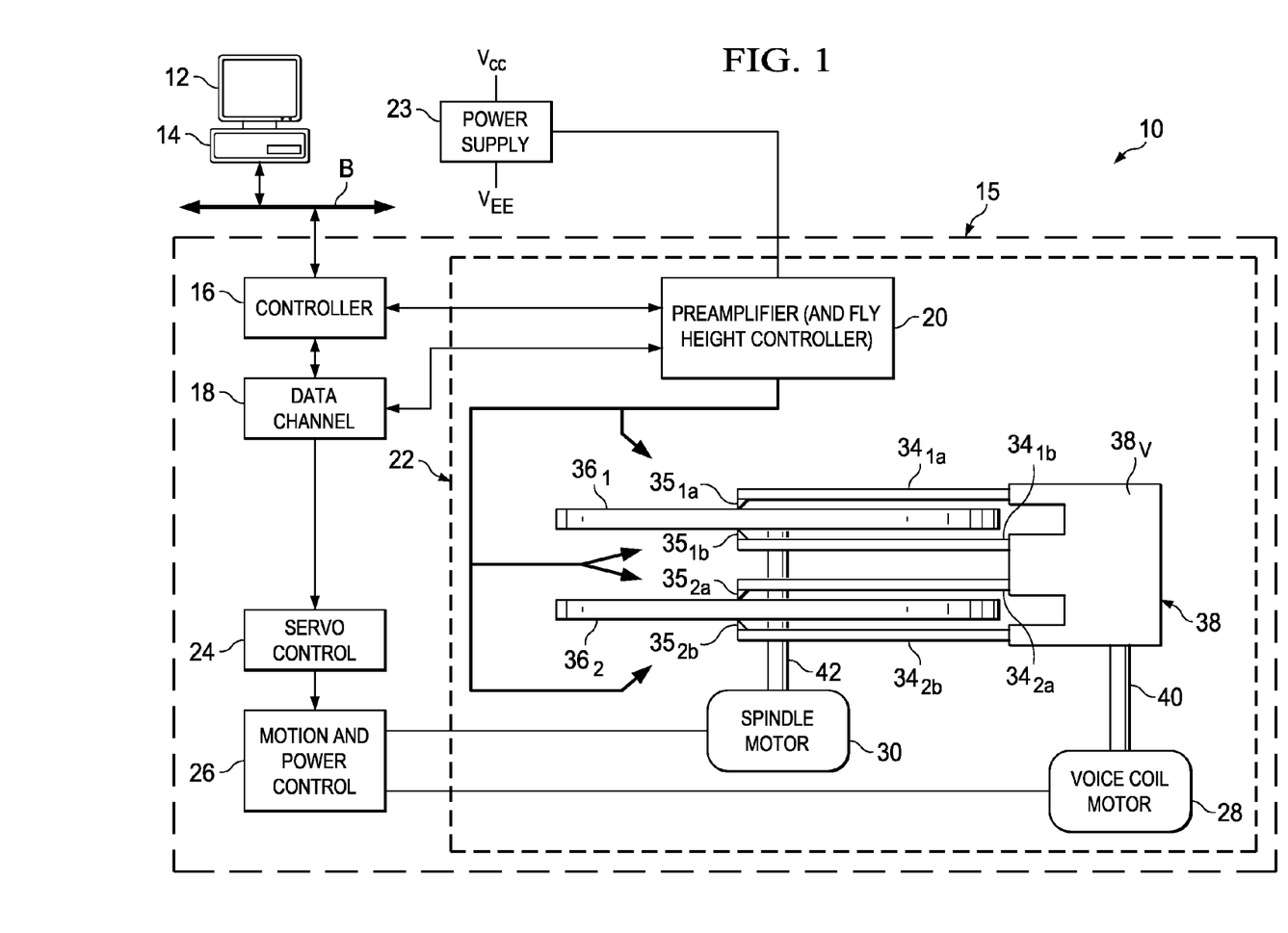
FIG. 1 illustrates an example of a computer system 10 into which a preferred embodiment may be implemented.

FIG. 1 illustrates a functional and electrical block diagram of an example of a computer system 10 into which a preferred embodiment is implemented. Certain aspects of system 10 are known in the art but overall the system is improved by additional aspects detailed later. In the FIG. 1 example, system 10 includes a computer 12, realized in many ways in the conventional manner. For example but not explicitly illustrated in FIG. 1, computer 12 includes a central processing unit ("CPU"), random access memory ("RAM"), video, sound cards or functionality, network interface capability, and the like. Computer 12 also includes a host adapter 14, which connects on one side to an internal system bus (not shown) of computer 12, and on the other side to a bus B. Bus B is preferably implemented according to conventional standards, examples of which include the Enhanced Integrated Drive Electronics ("EIDE") standard or the Small Computer System Interface ("SCSI") standard. Bus B, either directly or via an interface (e.g., interface adapter) is also connected to a disk drive assembly 15 and more particularly to a disk drive controller 16 of assembly 15. While not shown, other disk storage devices (hard disk controllers, floppy drive controllers, etc.) and other peripherals also may be connected to bus B, as desired and in a conventional manner.

Controller 16 is in certain respects a conventional disk drive controller as known in the art, although as described later, preferably a signal from it (or data channel 18) is used in connection with the preferred embodiments so as to improve power performance by reducing the amount of power consumed by the read circuitry during write operations, while also facilitating a fast recovery to full power to the read circuitry when a transition is desired to read operations. In modern disk drives in which the drive electronics are implemented at the disk drive rather than as a controller at computer 12 itself, controller 16 is implemented in connection with a printed circuit board within disk drive 15. Of course, in larger scale systems, controller 16 may be implemented within computer 12. In the generalized block diagram of FIG. 1, controller 16 as well as the other components of drive 15 are shown according to their functions, rather than their physical integrated circuits, for the sake of clarity. Typical integrated circuits used to implement disk drive controllers such as controller 16 include a digital signal processor ("DSP"), read-only memory ("ROM") and RAM, other non-volatile storage such as flash RAM, interface circuitry connected to bus B, and other custom logic circuitry. Controller 16 is connected to a data channel 18 and also to a preamplifier (and possibly fly height controller) 20 of a hard disk assembly 22. Preamplifier 20 is shown in FIG. 1 in schematic block form and is preferably a single integrated circuit that may be located within the drive in various locations, with one example being affixed to E-block 38, described below, although to simplify the functional illustration of FIG. 1 preamplifier 20 is merely shown generally in electrical relation to other blocks in FIG. 1—the reader is also invited to read U.S. patent application Ser. No. 11/844,924, filed Aug. 24, 2007, and entitled "Thermally Enhanced Disk Drive" for more details with respect to inventive embodiments relating the affixation of preamplifier 20 to an E-block, and which is hereby incorporated herein by reference. Returning to the connectivity of FIG. 1 and by way of introduction and context here, preamplifier 20, which receives power from rails of $V_{CC}$ and $V_{EE}$ via a power supply 23, controls the reading or writing of data with respect to the storage media, where more particularly in this regard preamplifier 20 provides appropriate signals via traces to one or more read/write head sensor assemblies $35_x$, and where each such assembly $35_x$ is supported at a position near either an upper or lower surface of a respective disk $36_x$; in the example of FIG. 1, two such disks $36_1$ and $36_2$ are shown as the storage media, with disk $36_1$ having respective sensor assemblies $35_{1a}$ and $35_{1b}$, and disk $36_2$ having respective assemblies $35_{2a}$ and $35_{2b}$. Each assembly $35_x$ extends from a respective arm $34_x$ of a common movable member or actuator referred to as a so-called E-block 38, which gets its name because its cross section has roughly an "E" shape in that, in the perspective shown in FIG. 1, there is a vertical section $38_v$ and then extending from that section is a horizontal upper arm supporting assembly $34_{1a}$, horizontal middle arm supporting assemblies $34_{1b}$ and $34_{2a}$, and a horizontal lower assembly supporting assembly $34_{2b}$. In any event, the supporting arms $34_x$ support a respective sensor assembly $35_x$ so that each such assembly is proximate a surface of one of the disks and therefore for reading data from and writing to the disks $36_1$ and $36_2$, where these disks thereby serve as the storage media of hard disk assembly 22. Returning to data channel 18, note that it communicates with a servo control 24, which in turn communicates with a motion and power controller 26, which drives a voice coil motor 28 that rotates an axle 40 through an arc and that is connected to and thereby rotates E-block 38 to pivot or move about that same arc and thereby to move its associated supporting arms $34_x$ relative to the surface of disks $36_x$. Motion and power controller 26 also controls a spindle motor 30 that fully rotates an axle 42 that is connected to and thereby fully rotates disks $36_1$ and $36_2$. Lastly, note that various additional items may be associated with the apparatus and circuitry shown in FIG. 1, and such items are known to one skilled in the art but are eliminated from the illustration and discussion so as to focus the present discussion.

Looking in general to the operation of computer system 10 with respect to reading and writing data from and to hard disk assembly 22, disks $36_1$ and $36_2$ have ferromagnetic surfaces (on either one or both sides) that spin about their axis under the control of spindle motor 30. Further, read/write head supporting arms $34_x$ are movable by E-block 38 when E-block 38 is moved or pivoted by motor 28 and axle 40. Accordingly, signals from controller 16 cause additional signals from motion and power control function 26 to control spindle motor 30 and voice coil motor 28 so that E-block 38 moves (e.g., partially rotates) and thereby positions the read/write head sensor assemblies $35_x$ at the desired locations near the surface of each disk $36_x$ to write or read the desired data. During the same time period, preamplifier 20 appropriately energizes the read/write head sensor assemblies $35_x$ to either read data from, or write data to, an appropriate one or more of the disks $36_x$. Accordingly, data in this manner is communicated between preamplifier 20 and data channel 18, such as from bus B to a desired disk $36_1$ or $36_2$ of from such a desired disk $36_1$ or $36_2$ back to bus B. Thus, such data is further accessible by other items connected directly to, or coupled via other circuitry, to bus B.

Figure 2:
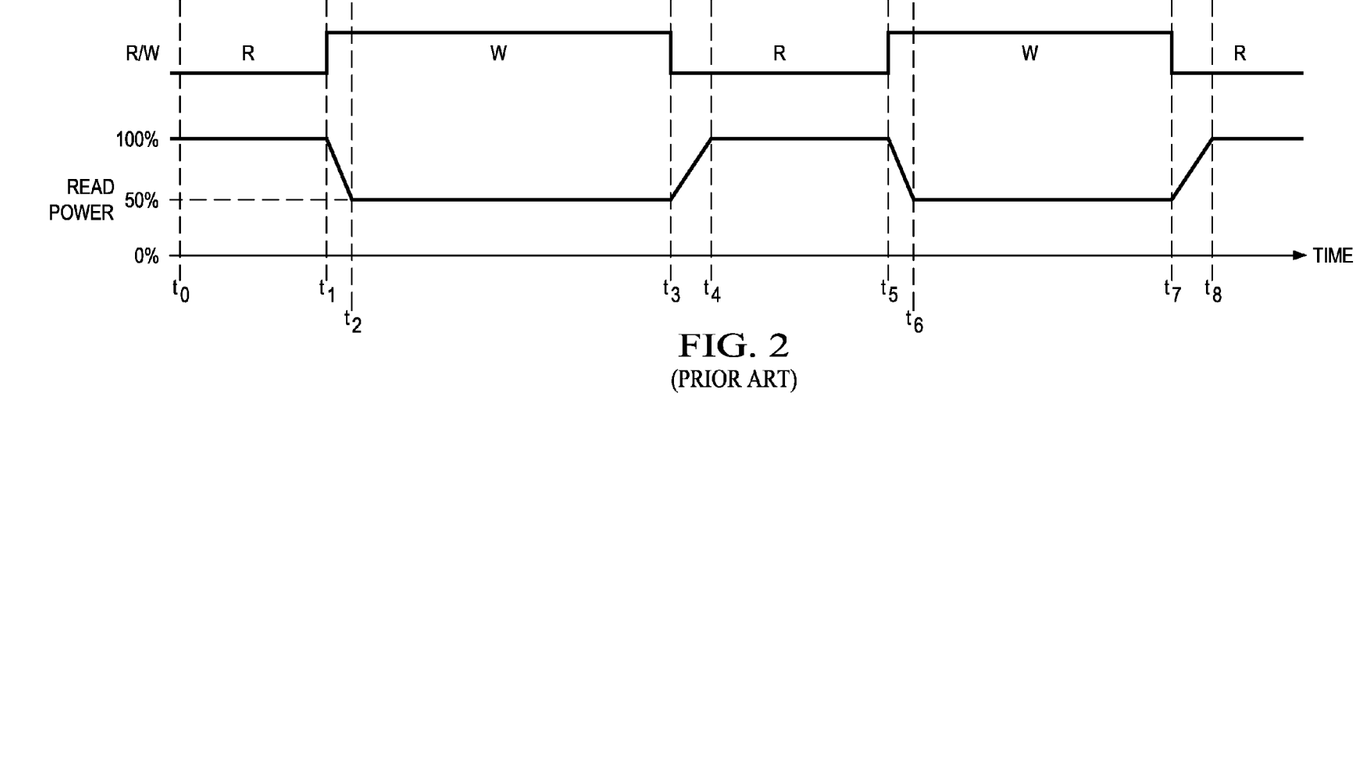
FIG. 2 illustrates a timing diagram of the prior art operation of a computer system with respect to reading and writing data from and to a hard disk assembly.

FIG. 2 illustrates a timing diagram of the prior art operation of a computer system comparable in various respect to system 10 and with respect to reading and writing data from and to hard disk assembly 22, so as to further facilitate a later appreciation of certain aspects of the preferred embodiments. Particularly, the first row of FIG. 2 illustrates a control signal, R/W, either received by or from preamplifier 20, but in any case to control sensor assemblies $35_x$ and over time. The signal R/W is intended to depict any type of control that in one instance requests a read operation and in another instance requests a write operation, where the particular states or signals to choose between these instances may vary based on implementation. In the example of FIG. 2, therefore, R/W is a single signal with complementary states shown in the vertical direction such that when R/W is asserted low it requests a read operation, and when R/W is asserted high it requests a write operation, where of course the opposite polarity also could be implemented. Continuing with the convention used in FIG. 2, therefore, each low period of the signal R/W is labeled R to demonstrate a read operation request and each high period of the signal R/W is labeled W to demonstrate a write operation request. The second row of FIG. 2 illustrates horizontally the operational timing of the read circuitry that is activated in response to a read request of the R/W signal of the first row, while the vertical dimension of that signal depicts the relative amount of power used by that circuitry (i.e., shown as Read power) at the different times shown therein. These various signals are further appreciated below.

Looking now to the signal states in FIG. 2, following time $t_0$, preamplifier 20 R/W is asserted low to request a read operation and thus, after time $t_0$ and prior to time $t_1$, an appropriate amount of power and control are provided by preamplifier 20 so as to cause assemblies $35_x$ to read from the appropriate disk(s) $36_x$. In this respect, recall that preamplifier 20 receives power from a power supply 23; thus, preamplifier 20 may control the amount of that power as further provided to the read circuitry that is used to cause assemblies $35_x$ to read from the appropriate disk(s) $36_x$, which by way of example for a preferred embodiment is detailed later in connection with FIG. 6; nonetheless from FIG. 2 at this point, its bottom row illustrates that 100% of the power needed to accomplish a read operation is expended between times $t_0$ and $t_1$. The actual absolute amount of power so needed may vary based on implementation, and in contemporary examples could be various levels. For example, in some applications the read power may be approximately 1.0 Watt or less, where for example it also may be in the range of 600-800 mWatt, and the trend is toward even lower read power requirements such as in the range of 100 to 400 mWatt, where it is anticipated that still further trends will be toward continuing to reduce these power levels.

At time $t_1$, R/W transitions from low to high, which by the convention for this example thereby changes the request of preamplifier 20 from read to write, and note that this change may occur at preamplifier 20 in response to a signal from controller 16 (or in alternative embodiments from elsewhere). Thus, following some delay show as the period from time $t_1$ to time $t_2$, the write functionality of preamplifier 20, and of the assemblies $35_x$ that it controls, is enabled. Also during the transition from time $t_1$ to time $t_2$ and per the prior art, the read power reduces with the recognition that full read power, that is, power sufficient to perform a read, is not at that time needed since hard disk assembly 22 is transitioning to a write operation instead of a read operation. However, in the prior art, the read power does not transition all the way to zero power; instead, the read power is reduced to a level that is approximately 50% to 66% of the full power needed to accomplish a read operation—this reduced power level is sometimes referred to as bias-off level in the art, meaning that the full bias necessary to accomplish a read is at an off level. However, by keeping the read power at a level of 50% to 66% of full read power, that is, considerably higher than zero, less time to commence a next read operation is needed when a write-to-read transition is thereafter desired. In other words, with the read power already at 50% to 66%, then the time needed to charge the read circuitry back to adequate level to accomplish a read is shorter than if the power were completely turned off to the read circuitry.

At time $t_3$, R/W transitions from high to low, thereby changing the request of preamplifier 20 from write to read. Thus, following some delay shown as the period from time $t_3$ to time $t_4$, the write is disabled and instead the read functionality of preamplifier 20, and of the assemblies $35_x$ that it controls, is enabled. Also during the transition from time $t_3$ to time $t_4$, the read power necessarily increases to its full (i.e., 100%) level so as to accomplish the requested read period, as is shown following time $t_4$. Note also that the actual duration of the transition from time $t_3$ to time $t_4$ will vary based on various factors, including process parameters, device size and components, and the like. In a contemporary device, this transition requires approximately 70 nsec, that is, the time required following a request by R/W of a read operation is presently about 70 nsec.

FIG. 2 also illustrates that the transitions described above may continue over time. Thus, at time $t_5$, again R/W transitions from low to high, thereby changing the request of preamplifier 20 from read to write, and one skilled in the art will appreciate the operation following time $t_5$ as comparable to that following time $t_1$. In opposite fashion, at time $t_7$, again R/W transitions from high to low, thereby changing the request of preamplifier 20 from write to read, and one skilled in the art will appreciate the operation following time $t_7$ as comparable to that following time $t_3$. In all events, therefore, note that when a read operation is requested (e.g., time $t_3$ or time $t_7$), the transition time to accomplish the requested read after that request (e.g., approximately 70 nsec) is benefited in that at the time of the read request, the read power is already at 50% to 66% of the full read power and, therefore, the time for that power to ramp upward to 100% is less than that which would be required if the read power had been reduced to less than 50%.

Figure 3A:
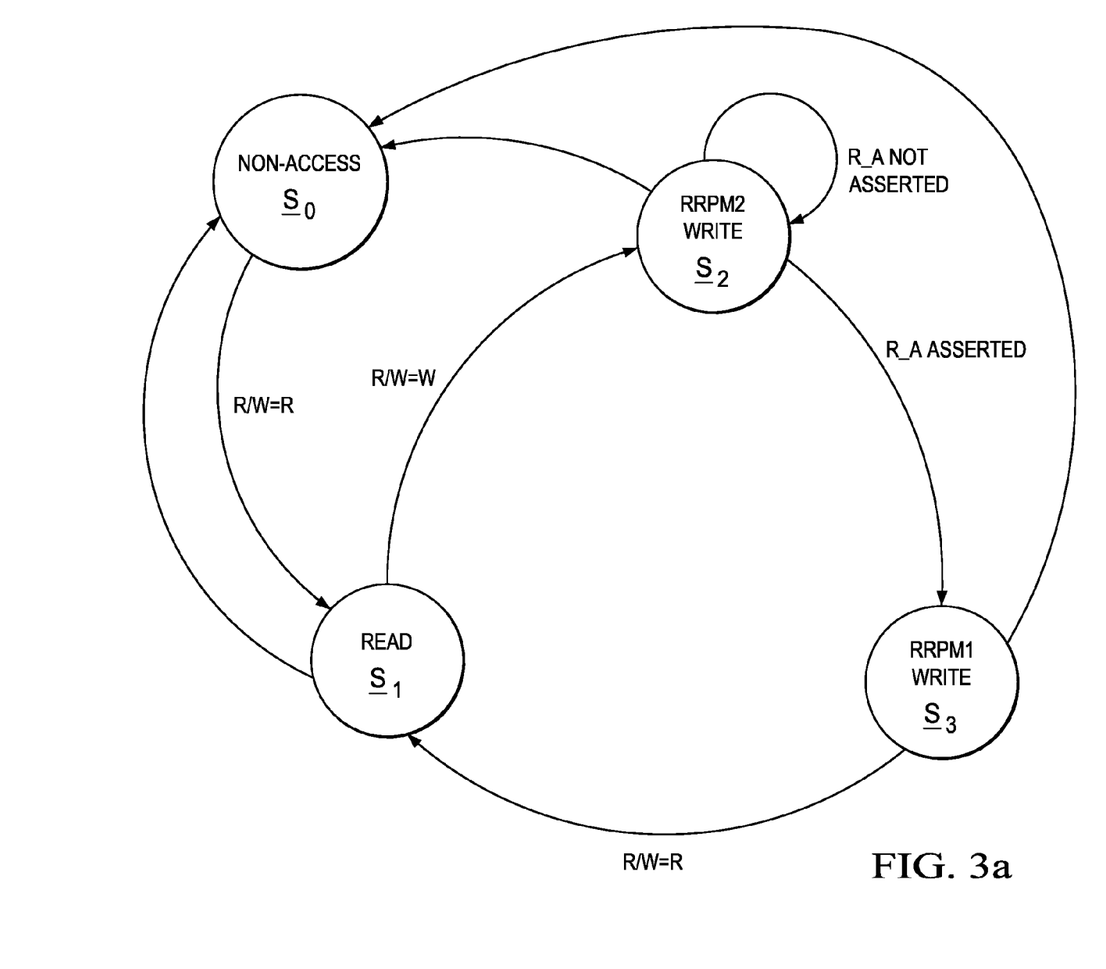
FIG. 3a illustrates a state diagram of certain preferred functional and operational steps of a computer system with respect to reading and writing data from and to a hard disk assembly per a preferred embodiment.

Turning now to a preferred embodiment, additional functionality is implemented into system 10 so as to accomplish operations consistent with FIG. 3a, which is now described. FIG. 3a illustrates a state diagram of certain preferred functional and operational steps of computer system 10 with respect to reading and writing data from and to hard disk assembly 22 and achieved, by example, via the control of preamplifier 20 per a preferred embodiment; in these respects, therefore, system 10 represents a novel system that is improved as will be appreciated through the remainder of this document. With respect to FIG. 3a, a state diagram is chosen by way of example and without limitation, and one skilled in the art may appreciate that various other steps may be added, removed, or substituted for certain steps or also may occur at the same time as those illustrated and described herein, where such states need not be described while the focus is on certain inventive aspects. Moreover, the illustrated steps may be achieved with, or implemented by, various devices, including but not limited to sequential logic gates or the like. In any event, FIG. 3a demonstrates read and write operations as performed by assemblies $35_x$ with respect to disks $36_x$ and in connection with a control signal R/W which, as introduced above, may be asserted in one state to request a read operation and in another state to request a write operation. In addition, FIG. 3a also includes a preferred embodiment signal designated as R_A, which is so named to reflect that the signal is asserted in advance of an expected need to perform a read; thus, R_A is asserted active at a time in advance of a desired transition between a write operation and a read operation. This R_A signal is used to trigger operations that provide benefits over the prior art, as further detailed below. Further, in a preferred embodiment, the R_A signal may be provided by controller 16 to preamplifier 20, as further detailed later.

Figure 4:
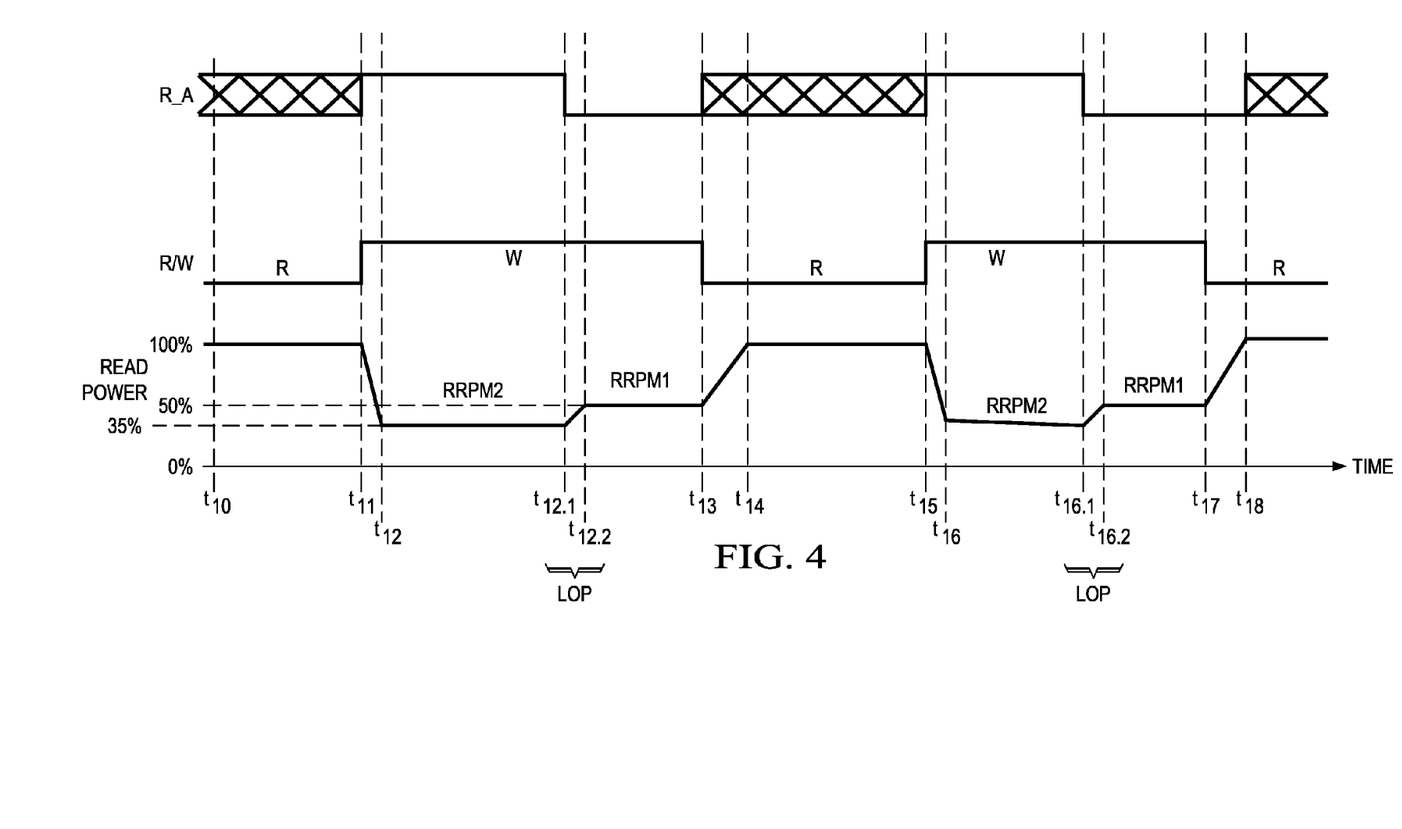
FIG. 4 illustrates a timing diagram of an example of operation of a preferred embodiment.

The states of FIG. 3a are now explored, and to further appreciate those states and the transitions between them in connection with hard disk assembly 22, reference is also made to FIG. 4, which illustrates a timing diagram of operation of a preferred embodiment. More particularly, FIG. 4 is comparable in some respects to the prior art timing diagram of FIG. 2 in that its top row illustrates the R/W requests and its bottom row illustrates read power. In addition, however, FIG. 4 also illustrates the above-introduced preferred embodiment R_A signal, which for sake of example is an active low signal, meaning the signal is considered active (i.e., indicating an upcoming read operation) when it transitions from high to low. Moreover, with the R_A signal, the preferred embodiment responds thereto so as to create a different functionality and result versus that of the prior art, which is appreciated by a comparison of FIG. 4 to FIG. 2 and as further detailed below.

Returning to FIG. 3a, in state $S_0$, hard disk assembly 22 is shown to be in a non-access state, meaning that at that time, neither a read of data from a disk $36_x$ nor a write to a disk $36_x$ is occurring. In different implementations or conventions, such a non-access state $S_0$ may occur in certain instances and may be identified with various names in the art. In any case, in this non-access state $S_0$, and although not shown in the timing diagram of FIG. 4, the power consumption by hard disk assembly 22 may be reduced considerably by lowering the supply voltage that is provided to various of the items in assembly 22. In the preferred embodiment, there is contemplated that at some point when in non-access state $S_0$, R/W is asserted to request a read (i.e., R/W=R). Typically the assertion of R/W for a read will be in response to some other corresponding signal transition received by preamplifier 20 from data channel 18 or a controller 16. As a result, a state change occurs from non-access state $S_0$ to read state $S_1$, where the latter demonstrates that a read operation is occurring in disk assembly 22. For an additional depiction of the operation of read state $S_1$, FIG. 4 illustrates events when such a read is occurring following a time $t_{10}$, where the subscript "10" is chosen as a starting point in FIG. 4 so as to avoid any confusion with the earlier references to timed events in FIG. 2.

Once the reading of data in read state $S_1$ is accomplished by assembly 22, that is, by one or more sensor assemblies $35_x$ from one or more disks $36_x$, then a state change may occur either back to non-access state $S_0$, or alternatively R/W may transition so as to request a write (i.e., R/W=W), such as shown in FIG. 4 at time $t_{11}$. Moreover, in one preferred embodiment this R/W signal transition also invokes a state change from read state $S_1$ to an RRPM2 write state $S_2$, where the designation RRPM2 is now explored. Specifically, in the preferred embodiment, in response to a transition request from a read operation to a write operation, the power supplied to some or all of the read circuitry of disk assembly 22, shown generally as provided by power supply 23 and in connection with voltage rails $V_{CC}$ and $V_{EE}$, is reduced to that circuitry to a level maintained lower than that described above with respect to the prior art, and this lower power level is referred to herein as a Read Reduced Power Mode 2, or RRPM2. Thus, in one embodiment, the RRPM2 power level is provided from power supply 23, via preamplifier 20, to appropriate read circuitry such as detailed later in FIG. 6, although one skilled in the art may provide alternative manners to adjust the power consumption of that read circuitry of a disk assembly 22 during write operations. In any event, the aspect of controlling read power consumption is also illustrated in FIG. 4, where recall that the R/W transition from read to write occurs at a time $t_{11}$. Per the preferred embodiment, and following some delay shown as the period from time $t_{11}$ to time $t_{12}$, the write functionality of preamplifier 20, and of the assemblies $35_x$ that it controls, is enabled. However, also during the transition from time $t_{11}$ to time $t_{12}$ and per the preferred embodiment, the read power is reduced toward and eventually maintained at a preferable level that is less than that of the bias-off level in the prior art and that may be selected by one skilled in the art according to the teachings of this document and other design criteria; in the illustration of FIG. 4 the reduction is by way of example to a level that is approximately 35% of the full power needed to fully power some or all circuitry required to accomplish a read operation—since this reduced power level is below that of the bias-off level in the prior art, then during write operations it saves still additional power as compared to that saved by using the bias-off level. Moreover, note that the example of a reduction to approximately 35% of the full power is only by way of example, and indeed in one preferred approach the reduction may be in the range of 10% to 35% of the full read power needed to perform a read. Indeed, in yet another example, the reduction may be to even lower levels, such as from 0% to 10% of the full power needed to perform a read, whereby the level of 0% is intended to demonstrate that in such an embodiment the power to some or all of the read circuitry may be completely interrupted, while with the appropriate control per the teachings of this document a proper recovery may be made to accomplish a transition from write to read. In any event, therefore, the example shown in FIG. 4 and discussed hereafter of 35% is not intended as an exhaustive limitation.

When writing of data is commenced by assembly 22 in RRPM2 write state $S_2$, that is, by one or more sensor assemblies $35_x$ to one or more disks $36_x$, then such writing may continue and therefore assembly 22 may remain in RRPM2 write state $S_2$ so long as R/W continues to request a write. As a result, during these write operations, the reduced power of RRPM2 is maintained and provides additional power savings versus the prior art. For example, in FIG. 4, this occurs for some period following time $t_{12}$. Further, as shown in FIG. 3a (but not FIG. 4), a state change may occur from RRPM2 write state $S_2$ back to non-access state $S_0$. Still further, however, and per the preferred embodiment, alternatively a transition occurs from RRPM2 write state $S_2$ to an RRPM1 write state $S_3$ if the signal R_A is asserted, where recall that signal was introduced above as a signal asserted in advance of an expected need to perform a read operation. Note that RRPM1 write state $S_3$ uses the designation of RRPM1 to indicate that it too implements a Reduced Read Power Mode, but the level (i.e., "1" in the designation of RRPM1) of read power maintained and consumed during RRPM1 write state $S_3$ is greater than that maintained and consumed during RRPM2 write state $S_2$. Comparable to the RRPM2 level, in one embodiment the RRPM1 power level is provided from power supply 23, via preamplifier 20, to appropriate read circuitry to adjust upward, relative to state $S_2$, the power consumption of that read circuitry of a disk assembly 22 during write operations. Also in this regard and by way of example, in one preferred embodiment, RRPM1 write state $S_3$ may operate in a manner comparable to the write operation and bias-off level as described above in connection with FIG. 2. To further illustrate the change from RRPM2 write state $S_2$ to RRPM1 write state $S_3$ when the signal R_A is active, FIG. 4 illustrates such an event starting at a time $t_{12.1}$. Specifically, at that time $t_{12.1}$, the signal R_A is asserted active (e.g., low), and in response and following a delay shown between time $t_{12.1}$ and time $t_{12.2}$, writing continues but the read power rises from the average lower level (e.g., 35%) associated with and maintained in RRPM2 write state $S_2$ to an average higher level (e.g., 50%) associated with and maintained in RRPM1 write state $S_3$. Note, however, that the read power of write state $S_3$ is still less than the 100% of power required to accomplish a read, and in the example illustrated, the read power of write state $S_3$ is approximately 50% of that necessary to accomplish a read operation, again similar to the bias-off level of the prior art. One skilled in the art, however, could modify the read power of RRPM1 write state $S_3$ to be at other levels.

Additional aspects of the preferred embodiment as relating to the advance signal R_A are noteworthy. In the preferred embodiment, preamplifier 20 may receive various signals from data channel 18 and/or controller 16. Indeed, preferably preamplifier 20 includes a pin that may receive a signal that has one control function or meaning during read operations and a different control function or meaning during write operations, where a multiplexer or the like may be controlled by which of either the read or write is occurring so as to properly gate the received signal to the appropriate circuitry during the respective read or write operation. Thus, in the preferred embodiment, this signal is considered the R_A signal during a write operation, that is, if asserted active during a write operation it causes the functionality discussed above, that is, to transition between RRPM2 write state $S_2$ and RRPM1 write state $S_3$. However, this same signal may provide a different type of control if asserted active or inactive during a read operation. For this reason, FIG. 4 illustrates the R_A signal with cross-hatching during any read operation because during that time the electrical signal received at the pin, and that corresponds to R_A during write, may provide a completely different function during read. Therefore, the state of the signal that is the R_A signal during a write operation is in effect a "don't care" signal in FIG. 4 during read operations (hence, the cross-hatching during the read operation time periods), as that signal is not part of the focus of FIG. 4 which instead is included to illustrate the preferred embodiment multiple reduced read power mode levels. Moreover, the effect of this signal, if active during a read operation, is not detailed here as the results of that instance need not be discussed to appreciate the instant inventive scope.

FIG. 3a further illustrates the possibility of two different state changes from RRPM1 write state $S_3$. If neither a read nor a write is desired, then operation of assembly 22 may return from RRPM1 write state $S_3$ to non-access state $S_0$. Alternatively, if R/W is asserted to request a read (i.e., R/W=R), then operation of assembly 22 may return from RRPM1 write state $S_3$ to read state $S_1$. This latter alternative is shown again by way of example in FIG. 4 commencing at time $t_{13}$. Thus, following some delay show as the period from time $t_{13}$ to time $t_{14}$, the write is disabled and instead the read functionality of preamplifier 20, and of the assemblies $35_x$ that it controls, is enabled. Also during the transition from time $t_{13}$ to time $t_{14}$, the read power necessarily increases to its full (i.e., 100%) level so as to accomplish the requested read operation(s), as is shown following time $t_{14}$. Note also, therefore, that the transition from time $t_{13}$ to time $t_{14}$ of the preferred embodiment is comparable and indeed may be achieved during the same time required for the transition between FIG. 2 times $t_3$ and $t_4$ of the prior art. In other words, in both the prior art and the preferred embodiment, once the control signal R/W requests a read operation, the transition time of the disk drive to perform the requested read operation is the same, such as approximately 70 nsec. Therefore, the preferred embodiment achieves the additional power savings during RRPM2 write state $S_2$ while, thereafter when in RRPM write state $S_3$, having no loss or sacrifice in performance recovery time for the period that occurs between the R/W requests for a read and the commencement of the read operation.

One skilled in the art may appreciate the remaining illustrations of FIGS. 3a and 4 from the previous discussion. For example, once in read state $S_1$ in FIG. 3a, if R/W is asserted to request a write, then operation of assembly 22 transitions from read state $S_1$ to RRPM2 write state $S_2$, where as described above RRPM2 write state $S_2$ performs writing of data to one or more disks $36_x$ while maintaining the average read power supply and consumption of the read circuitry at a level that is less than the average read power during RRPM1 write state $S_3$; this transition is shown again by way of example in FIG. 4 commencing at time $t_{15}$, where after a delay from time $t_{15}$ to time $t_{16}$, the read power is reduced to the maintained RRPM2 level while writing of data occurs. Also by way of illustration, at a time $t_{16.1}$ thereafter, R_A transitions to active (i.e., to low) and, hence, per FIG. 3a, a state change occurs from RRPM2 write state $S_2$ to RRPM1 write state $S_3$, thereby permitting ongoing writing of data while increasing the read power to the average maintained RRPM1 level such as the off-bias level, as shown in FIG. 4 following time $t_{16.2}$. Finally, at time $t_{17}$, R/W transitions to request a read, and again with the same transition time performance between $t_{17}$ to $t_{18}$ as compared to the prior art, the preferred embodiment transitions and at time $t_{18}$ commences the fully-powered read operation.

Figure 3B:
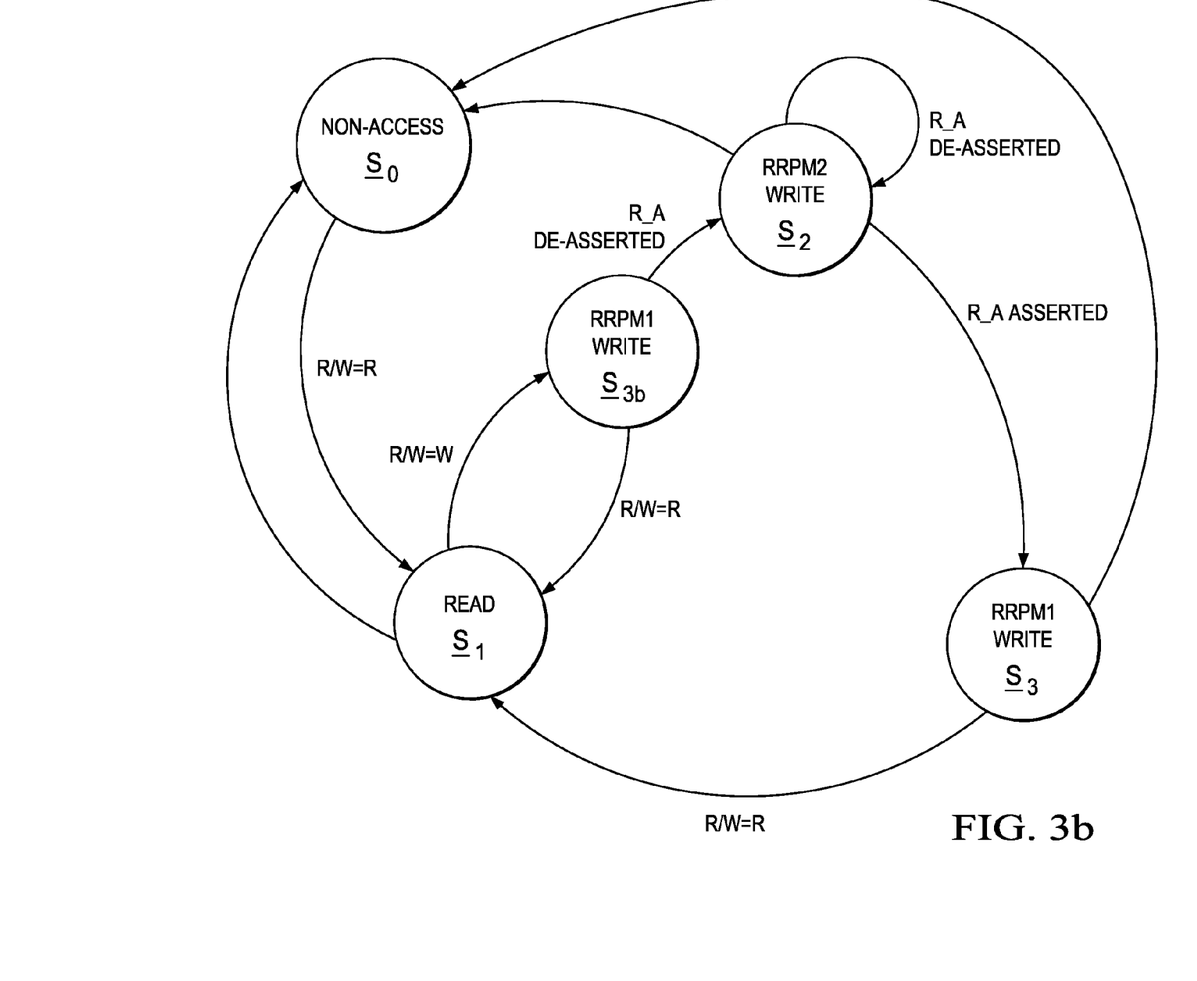
FIG. 3b illustrates the state diagram of FIG. 3a with additional modifications in another preferred embodiment.

FIG. 3b illustrates the state diagram of FIG. 3a with additional modifications in another preferred embodiment. Particularly, in FIG. 3b, the signal R_A is used during write operation to both transition to and transition away from the reduced read power mode RRPM2. States $S_0$ and $S_1$ are the same in FIGS. 3a and 3b and thus are not re-described here as the reader is assumed familiar with the earlier discussion. However, once in read state $S_1$, recall that in FIG. 3a a transition of R/W to request a write (i.e., R/W=W) caused a state change directly to RRPM2 write state $S_2$, wherein the write operations occur while the read power is reduced to the read power mode RRPM2; however, in FIG. 3b, the same transition of R/W to request a write first causes a state change from read state $S_1$ to a an RRPM1 write state $S_{3b}$, where state $S_{3b}$ performs comparable to an RRPM1 write state $S_3$ described in connection with FIG. 3a. Thus, in RRPM1 write state $S_{3b}$, write operations occur but the read power is reduced only to the reduced read power mode RRPM1, which recall could be at the same level as the reduced read power during write as used in the prior art. Moreover, once in an RRPM1 write state $S_{31}$, a transition of R/W to request a read (i.e., R/W=R) causes, as shown in FIG. 3b, a state change back to read state $S_1$. Given the addition of state $S_{3b}$ in FIG. 3b, one skilled in the art should appreciate that the R_A signal provides an additional control aspect so that, if desired, RRPM2 write state $S_2$ may be avoided by maintaining R_A in an asserted state during all write operations, in which case the read-to-write transition will be from state $S_1$ to state $S_{3b}$, and the write-to-read transition will be from state $S_{3b}$ to state $S_1$. Thus, if in a given implementation, or during certain times of operation, the use of RRPM2 write state $S_2$ is not desired, then the approach of FIG. 3b provides a control for achieving that result. However, also in FIG. 3b, if indeed the use of RRPM2 write state $S_2$ is desired, then R_A may be de-asserted at the same time as or shortly after the transition of R/W to request a write (i.e., R/W=W). In this latter case, a transition occurs from read state $S_1$, to RRPM1 write state $S_{3b}$, to RRPM2 write state $S_2$. Thus, during the latter time, both a request for a write is occurring and R_A is de-asserted, thereby causing power supplied to the read circuitry to be reduced to and maintained at the level of RRPM2 during the write operations. Thereafter, the possible transitions from state $S_2$ are as described above in connection with FIG. 3a, where note that if R_A is then asserted, it again operates as a gating signal to the power level of RRPM2 in that once so asserted, the transition occurs to RRPM1 write state $S_3$ wherein the larger average amount of power RRPM1 is applied and thereby ending the period of time during which the read circuitry was provided the average lower power level of RRPM2.

Figure 5A:
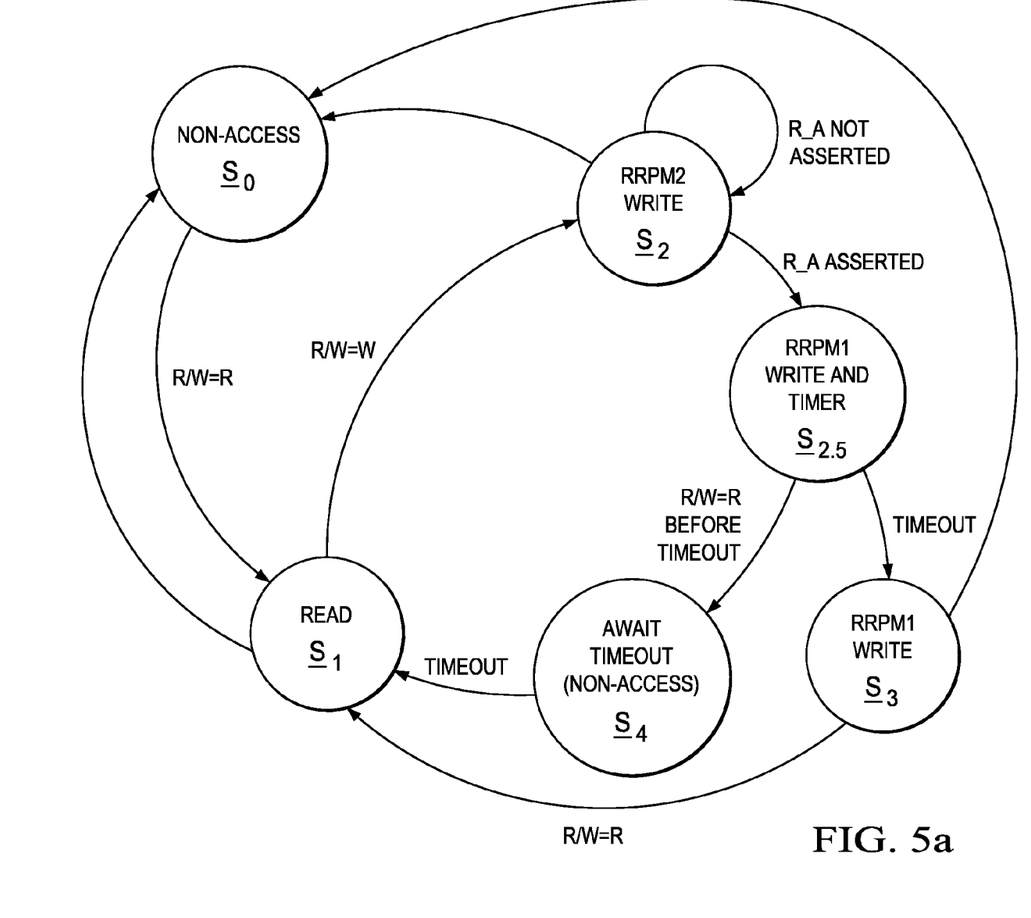
FIG. 5a illustrates the state diagram of FIG. 3a with additional modifications in another preferred embodiment.

FIG. 5a illustrates the state diagram of FIG. 3a with additional modifications in yet another preferred embodiment. Particularly, in FIG. 5a, a timer state $S_{2.5}$ is added between RRPM2 write state $S_2$ and RRPM1 write state $S_3$ and is now explained. Timer state $S_{2.5}$ is reached when R_A is asserted active (e.g., low) during RRPM2 write state $S_2$, such as occurs in FIG. 4 at time $t_{12.1}$. Timer state $S_{2.5}$ also illustrates that it includes the same Read Reduced Power Mode 1 as RRPM1 state $S_3$, thereby intending to demonstrate that a timer duration is associated with state $S_{2.5}$, and during a duration established by that timer only a write is permitted to occur while the read power transitions from the power level of RRPM2 to the level for RRPM1 (e.g., 50%); thus, preferably the timer duration of state $S_{2.5}$ is determined to be at least as long as the time it takes for RRPM2 power level to go to RRPM1 power level. Further, as an alternative and as shown by state $S_4$, a non-access period is maintained until the timer duration associated with state $S_{2.5}$ expires; however, also during state $S_4$, and because R_A has been asserted so a subsequent read is anticipated, then the read power is maintained at the higher power level of RRPM1 even while no write is occurring. Given the preceding, when a transition occurs from RRPM2 write state $S_2$ to timer state $S_{2.5}$, then the read power transitions from the lower power level of RRPM2 toward the higher power level of RRPM1, and so long as a write is still desired (e.g., so long as there is no transition in R/W), the power level of RRPM1 is maintained for at least as long as the duration of the timer associated with timer state $S_{2.5}$. Looking back to FIG. 4, for example, then at time $t_{12.1}$, R_A is asserted active, so with respect to FIG. 5a there is a state change from RRPM2 write state $S_2$ to timer state $S_{2.5}$. Thus, following the transition time between $t_{12.1}$ and $t_{12.2}$, assembly 22 continues to perform a write operation and the read power is changed to the RRPM1 level and maintained at that level for a duration associated with timer state $S_{2.5}$. In other words, until the timer associated with timer state $S_{2.5}$ times out (e.g., expires or reaches a threshold) and so long as a write is still desired, the write and RRPM1 power level are maintained. Accordingly, during the timer interim, assembly 22 is prohibited from performing a read operation. Additionally as shown in FIG. 5a, if R/W were for some reason to request a read during the period of the state $S_{2.5}$ timer and before a timeout of that timer, then a state change transitions from state $S_{2.5}$ to a non-access state $S_4$, where no access occurs but the power level remains at RRPM1 until the timer expires. Thus, in the non-access state $S_4$, because R/W has transitioned to request a read (e.g., R/W=R), then a write is no longer required so the operation leaves state $S_{2.5}$, but also because the timer associated with state $S_{2.5}$ has not yet timed out, then the circuit is maintained in a non-access condition of no write and no read in state $S_4$, but with partial power of RRPM1 to the read circuitry, until the timer times out. When the timer times out from state $S_4$, then a state transition occurs to state $S_1$, which recall from above operates at full read power and to accomplish read operation(s). Given the inclusion of state $S_4$, if some glitch or transient were to occur that could be perceived as a read request during state $S_{2.5}$ but before the timer times out, then state $S_4$ prevents an immediate read operation, so to ensure that there is ample time for the read power to rise to a level sufficient to support a read at a time after the timer expires. In other words, during the timer period of timer state $S_{2.5}$, there is a lockout period LOP of any read operation, and this aspect is illustrated generally in FIG. 4 at each instance of a transition from RRPM2 write state $S_2$ to timer state $S_{2.5}$, which therefore occurs at time $t_{2.1}$ and time $t_{16.1}$. As a result of the lockout period, any spurious operation that could otherwise occur due to an attempted read under insufficient read power is avoided. Further, given the preceding, note that the actual duration of the lockout period LOP may be selected by one skilled in the art based on various considerations. For example, one consideration is the amount of time in advance that R_A is anticipated to transition before the transition from write to read is necessary.

Figure 5B:
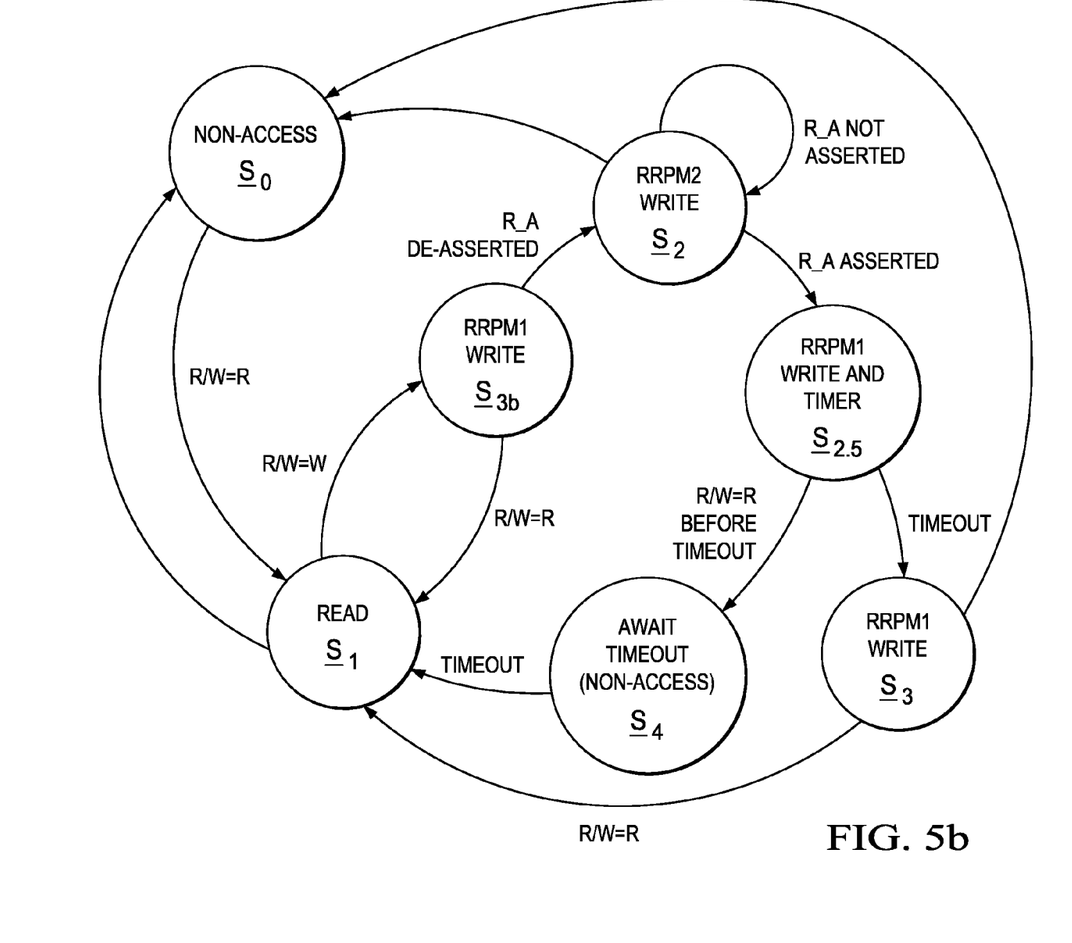
FIG. 5b illustrates the state diagram of FIG. 5a with additional modifications in another preferred embodiment.

FIG. 5b illustrates the state diagram of FIG. 3b with additional modifications that are comparable to the modification of FIG. 3a as shown in FIG. 5a. Thus, in FIG. 5b, an RRPM1 write state $S_{3b}$ is added that is reached from read state $S_1$ in response to a transition of R/W to request a write, and from the write operation(s) at power level RRMP1 in write state $S_{3b}$ a transition to a lower level of read power during a write operation is achieved by de-asserting R_A as shown in FIG. 5b in the transition from state $S_{3b}$ to RRPM2 write state $S_2$. Once in RRPM2 write state $S_2$, the transitions are the same as described above. Given FIG. 5b, therefore, one skilled in the art should appreciate that once RRPM1 write state $S_{3b}$ is reached, then a de-assertion of R_A permits write operations to continue while read power is reduced from the RRPM1 level to the RRPM2 level as shown in state $S_2$, and the lower RRPM2 level is maintained until R_A is thereafter asserted; once R_A is so asserted, the timer associated with the transition to state $S_{2.5}$ starts, and as detailed above prevents a read operation from occurring until the timeout associated with that timer is reached.

Figure 6:
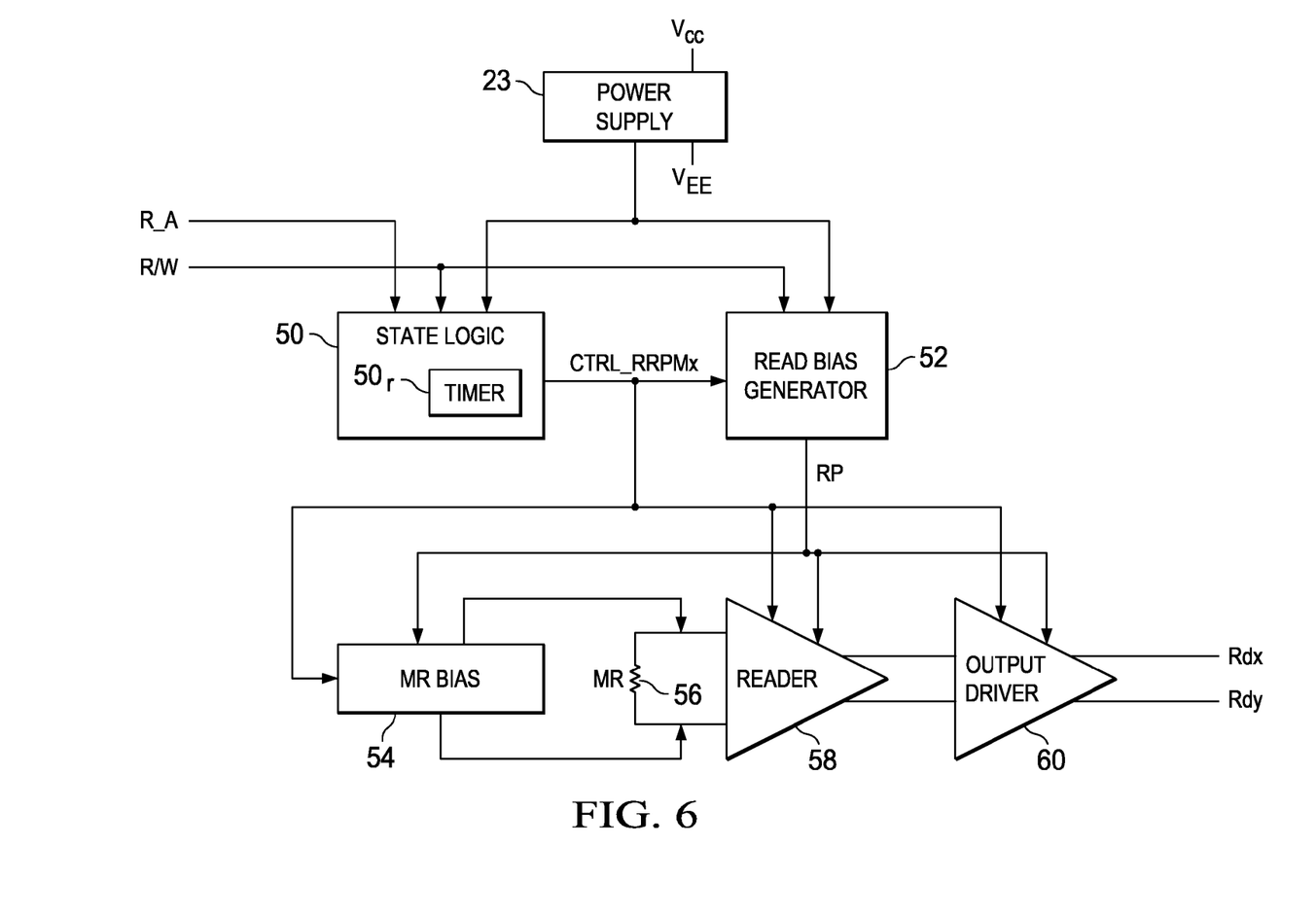
FIG. 6 illustrates an electrical functional diagram of a read path representative of that which may be implemented at least in part in connection with the preamplifier 20 of FIG. 1.

FIG. 6 illustrates an electrical functional diagram that includes a read path representative of that which may be implemented at least in part in connection with preamplifier 20 of FIG. 1 and according to a preferred embodiment. As discussed above, preamplifier 20 receives power from a power supply 23 and, thus, power supply 23 is also shown in FIG. 6 and, more particularly, that power is provided to a state logic circuit block 50 and to a read bias generator 52. State logic block 50 preferably implements the state diagram from one of FIGS. 3a, 3b, 5a, or 5b discussed earlier and, therefore, it is shown to receive as inputs the R/W and R_A signals, so as to effect state transitions in response to those signals as also described earlier. Moreover, to accomplish the timeout approaches of FIGS. 3b and 5b, block 50 is shown to include a timer 50T. Further, recall that the above-described state diagrams accomplish one of two Read Reduced Power Modes designated RRPM1 and RRPM2 and, thus, for this reason in FIG. 6 a control signal CTRL_RRPMx is shown as an output from block 50 (i.e., where x may be either 1 or 2), and that output is connected so that it may in some instances control read bias generator 52 and in addition is connected to other items in FIG. 6 so that it may control those as well in certain circumstances. In connection with receiving control signal CTRL_RRPMx, read bias generator 52 provides a read power value RP to the read path of disk drive assembly 15, where that path is illustrated in FIG. 6 by the remaining blocks therein. The read power value RP may provide full power to this read path when a read operation is to occur, or alternatively as discussed extensively above the read power level may be at either of the Read Reduced Power Mode levels RRPM1 and RRPM2 during a write operation (or RRPM1 may be maintained awaiting a timeout in state $S_4$).

Completing the discussion of FIG. 6, the read path is illustrated to include an MR (magneto-resistor) bias block 54, a magneto-resistor MR 56 (as implemented in an assembly $35_x$ of FIG. 1), a reader 58, and an output driver 60, where again each of these blocks receives the read power level RP from read bias generator 52. Other than receiving varying levels of the read power level RP per the preferred embodiments, each of these items is known to one skilled in the art. Briefly, therefore, MR bias block 54 provides the appropriate bias to magneto-resistor MR 56 so that the resistance of the latter may be measured, which as its name suggests varies in response to its nearby magnetic field. Further, note that MR bias block 54 is influenced by the R/W signal, so that during a read operation the full read bias is applied to magneto-resistor MR 56, whereas during a write operation then the bias provided is in response to the RP level from read bias generator 52, that is, the bias may be reduced to either RRPM1 or RRPM2 (or still other levels in other embodiments). In any event, the voltage across magneto-resistor MR 56, as influenced by the variance of resistance in response to the proximate magnetic field, is read by reader 58 during read operations, which in a general sense is accomplished by one or more amplifiers. Thus, during read operations reader 58 receives the full read bias from read power RP, whereas during a write operation the RP level may be reduced to provide either RRPM1 or RRPM2 to reader 58. An amplified differential signal is provided by reader 58 to output driver 60, the latter of which is a buffer and also operates in response to the power level RP. Thus, as with the other described components of the disk drive read path, output driver 60 receives the full read bias from read power RP during a read operation and provides differential outputs Rdx and Rdy, whereas during a write operation the RP level may be reduced to provide either RRPM1 or RRPM2. Given the preceding, note therefore that in the preferred embodiment, the power consumed by various circuitry in the read path may be reduced to RRPM2 during part of the period used for write operations, thereby improving overall power performance and also reducing the heat generated by such circuits.

From the above, it may be appreciated that the preferred embodiments provide a data storage drive with multiple levels or stages of average maintained read power reduction during a write operation. FIG. 4 illustrates an example of this functionality, where in that preferred embodiment two levels of such read power are implemented. One level of read power, during the write operation, is shown as RRPM2, and another level of read power, during the write operation, is shown as RRPM1. With this functionality, performance of the drive may be improved in various respects. For example, with less use of power, the heat inside the drive is reduced, thereby improving device reliability and life expectancy. Moreover, with less heat, the circuitry of the drive, such as the preamplifier, may be further reduced in size while still having an acceptable level of heat density. Further, the small circuitry gives rise to a lower unit cost. As still another benefit, with less heat generation, the drive may be operated at higher speeds given the additional margin permitted between the reduced heat and a larger level of acceptable heat as caused by the higher speeds. As still another benefit, while the additional stage of low power RRPM2 is provided, the recovery of a drive per the preferred embodiment, such as from RRPM1 write state $S_3$ (or even $S_4$) to read state $S_1$ is unaffected as compared to the prior art, so there is no reduction in performance in that regard. Further, while the above has demonstrated various preferred embodiment aspects, note that various other aspects also may be implemented. For example, while specific relationships and the inclusion into a computer system have been shown herein, the present teachings may be included in other systems and devices. As another example, while two alternative levels of read power reduction during a write operation have been described, still additional levels may be implemented. As still another example, while the read power reduction levels have been described herein at 35% and 50%, these numbers are by way of approximations and preferred examples, and one skilled in the art may select others as well. Indeed, for applications where relatively long durations of writes are probable, or where there is less need for a fast write-to-read transition, then the RRPM2 level may be reduced to levels in the range of 10% or even as low as 0% of the full power needed to support a read operation. Finally, while certain conventions have been used therein, they are not intended as limitations and may be changed in actual implementations or alternative embodiments, whereby for example the polarities of signals as active low could be reversed to active high and vice versa, different signal names and sources may be used to trigger state change and to control power supply or power consumption of the read circuitry during write operations, and the use of signals provided to and by certain functional blocks could be shifted to different functional block. Thus, in all events, the preceding demonstrates that while the present embodiments have been described in detail, various substitutions, modifications or alterations could be made to the descriptions set forth above without departing from the inventive scope which is defined by the following claims.

The invention claimed is:

1. A disk drive data storage system, comprising:
A. a data storage disk;
B. a sensor assembly proximate the data storage disk; and
C. control circuitry for writing data to the data storage disk in a write cycle and for reading data from the data storage disk in a read cycle, during a first time period of a write cycle the control circuitry reducing the read power to less than 50 percent of the maximum read power, and then in a second time period of that write cycle, after the first time period, the control circuitry increasing the read power to 50 percent of the maximum read power.

2. The system of claim 1 in which during the first time period the control circuitry reduces the read power to about 35% percent of the maximum read power.

* * * * *